United States Patent
Fadavi-Ardekani et al.

(10) Patent No.: US 6,707,822 B1
(45) Date of Patent: Mar. 16, 2004

(54) MULTI-SESSION ASYMMETRIC DIGITAL SUBSCRIBER LINE BUFFERING AND SCHEDULING APPARATUS AND METHOD

(75) Inventors: Jalil Fadavi-Ardekani, Newport, CA (US); Walter G. Soto, Irvine, CA (US); Weizhuang Xin, Aliso Viejo, CA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/479,611

(22) Filed: Jan. 7, 2000

(51) Int. Cl.$^7$ ............... H04B 1/38; H04L 5/16
(52) U.S. Cl. ............ 370/395.5; 370/466; 370/480; 375/222
(58) Field of Search .................. 370/230, 235, 370/235.1, 395.1, 412, 428, 429, 395.5, 480, 503, 505, 511, 512, 513, 514, 516; 375/222

(56) References Cited

U.S. PATENT DOCUMENTS

| | | | |
|---|---|---|---|
| 5,737,337 A | * 4/1998 | Voith et al. | 714/702 |
| 5,751,741 A | * 5/1998 | Voith et al. | 714/758 |
| 6,134,283 A | * 10/2000 | Sands et al. | 375/354 |
| 6,233,250 B1 | * 5/2001 | Liu et al. | 370/469 |
| 6,480,475 B1 | * 11/2002 | Modlin et al. | 370/294 |

OTHER PUBLICATIONS

U.S. Pub No.: 2002/0167949 A1 (Bremer et al., Provisional Filing Date Apr. 4, 1999).*
U.S. Pub. No.: 2002/0146014 A1 (Karlsson et al., Filing Date Apr. 6, 2001).*
U.S. Pub No.: 2203/0091053 A1 (Tzannes et al., Filing Date Oct. 4, 2002).*

* cited by examiner

Primary Examiner—Ricky Ngo
Assistant Examiner—Kevin Mew
(74) Attorney, Agent, or Firm—Synnestvedt & Lechner LLP

(57) ABSTRACT

A transceiver for an asymmetric communication system is provided that implements a buffering and scheduling scheme that utilizes a virtual clock signal to synchronize processing of asynchronous frame data for multiple ADSL sessions. In every virtual clock cycle, the transceiver first sequentially performs transmit-processes for each active ADSL line and then sequentially performs receive-processes for each active ADSL line. An Asynchronous Transfer Mode (ATM) Accelerator provides the network interface to multiple ATM channels and communicates frame data to a Frame Buffer (FB). The FB may be used in a ping-pang fashion for the communication of data between the ATM accelerator and a Framer/Coder/Interleaver (FCI), which performs its namesake, among other, functions. The FCI also interfaces a Digital Signal Processing (DSP) core through an Interleave/De-Interleave Memory (IDIM). The DSP core generates the virtual clock signal, which schedules operation of the ATM accelerator and the FCI. IDIM holds DMT frames of data and may also be utilized in a ping-pang fashion. Memory is shared by multiple ADSL sessions and by the transmit and receive processes within an individual session.

26 Claims, 2 Drawing Sheets

US 6,707,822 B1

MULTI-SESSION ASYMMETRIC DIGITAL SUBSCRIBER LINE BUFFERING AND SCHEDULING APPARATUS AND METHOD

FIELD OF THE INVENTION

The invention relates generally to broadband communications, and more particularly to the transmission of broadband signals using twisted-pair cable.

BACKGROUND

High-speed data communications paths are desirable for Internet access and are essential for high data rate interactive services such as video on demand. Since fiber optic cable, the preferred transmission media for such services, is not readily available in the transmission link between a network node and a user premise and is prohibitively expensive to install, it is desirable to utilize the existing Plain Old Telephone Service (POTS) infrastructure. However, current POTS wiring connections consist of copper twisted-pair media which was designed for low frequency, voice-band (0–3400 Hz) analog telephony, and does not readily support the data rates or bandwidth required for high data rate interactive services. Conventional POTS analog transmission is limited to a data rate of about 56 Kbps, which represents only a small portion of the amount of information that can be transmitted over twisted-pair media.

DSL (Digital Subscriber Line) provides a method of communicating high-bandwidth data over twisted-pair media. In addition, some forms of DSL service (e.g., ADSL) include a subdivision of the DSL bandwidth so that some bandwidth is used to provide POTS service simultaneously with data transmission. Thus, DSL enables high data rate interactive services without requiring the installation of fiber optic cable.

Asymmetrical Digital Subscriber Line (ADSL (ANSI T 1.413-1998)) is specifically designed to exploit the asymmetric nature of most multimedia communication, in which large amounts of information flow toward an end user (i.e., downstream) and only a small amount of information (e.g., interactive control information) is returned by the end user to a central office (i.e., upstream). ADSL is "asymmetric" in that most of its two-way (duplex) bandwidth is utilized to transmit downstream and only a small portion is utilized for upstream transmission. Using ADSL, approximately 6–8 Mbps of data can be sent downstream and approximately 512 Kbps can be sent upstream. Other variations of DSL (i.e., xDSL) include High bit rate DSL (HDSL) and Very high bit rate DSL (VDSL).

Many DSL technologies require that a signal splitter be installed at a remote end user location to split POTS service from the digital data transmission. However, the line split for an end user can be managed remotely from a central office using G.Lite (a/k/a DSL Lite, splitterless ADSL, and Universal ADSL), which is essentially a slower form of ADSL. Equipment installation costs are saved using G.Lite (ITU-T standard G-992.2), which provides a data rate of approximately 1.5 Mbps downstream and approximately 512 Kbps upstream.

In a conventional ADSL communication system, an ADSL transceiver at each end of a twisted-pair (a remote end user premise and a central office) connects to the twisted-pair circuit, creating information channels—a high speed downstream channel, a medium speed upstream channel, and depending on implementation, a POTS or an Integrated Services Digital Network (ISDN) channel. Each channel can be sub-multiplexed to form multiple, lower rate channels utilizing one of several modulation technologies. One such modulation technology, Discrete MultiTone (DMT), is a multi-carrier technique that divides the available bandwidth of twisted-pair media connections into mini-subchannels or bins. In the ADSL standard, DMT may be used to generate up to 250 separate 4.3125 Khz subchannels from 26 Khz to 1.1 Mhz for downstream transmission and up to 26 subchannels from 26 Khz to 138 Khz for upstream transmission. Other modulation technologies used with ADSL include Carrierless Amplitude Modulation (CAP) and Multiple Virtual Line (MVL).

At the central office in a typical ADSL system, a Digital Subscriber Line Access Multiplexer (DSLAM) multiplexes/de-multiplexes a unique set of data for each of multiple ADSL lines, concentrating the ADSL lines into a single terminating device for connection onto the backbone network interconnecting central offices. An ADSL transceiver associated with each ADSL line is in communication with the DSLAM. For the unique data stream of each ADSL line, the ADSL transceiver provides data to (and receives data from) several channels with the data grouped into frames that include both payload data bytes and overhead data bytes. Data from each channel is placed in different positions in a frame depending on whether the data is interleaved or non-interleaved. In general, for transmission, a frame is assembled from the payload data of the channels with overhead bytes appended as appropriate. In particular, a cyclic redundancy check (CRC), scramble, interleave (if selected), and forward error correction (FEC) are performed on the frame data prior to its transmission. The frames in turn are grouped together into a "superframe" which includes 68 data frames plus an additional synchronization frame, which delineates the superframe boundary. A CRC is performed on all the data in a superframe and transmitted in the overhead bytes of the first frame of the next superframe. The frame data is converted into a set of complex symbols, each of which represents a number of frame bits as defined by a bit allocation table. These complex symbols are subsequently converted into an analog signal that is transmitted on a twisted-pair. Conversely, when receiving an analog signal from a twisted-pair, an ADSL transceiver must convert the analog signal into complex digital symbols, convert the complex symbols into a receive frame, and de-interleave, FEC, CRC, and de-scramble the received frame to recover payload data.

In order to provide service to multiple remote end user premises, the central office of an ADSL communication system needs to support multiple ADSL lines, each line having a session or active period of data transfer. In addition, the central office must manage asynchronous downstream and upstream data streams for each ADSL session since, the recurrence of frames containing data for/from an individual remote end user is not necessarily periodic. In a conventional ADSL communication system, the central office has an ADSL transceiver for each remote end user served by the system. Such a system is excessively duplicative in terms of transceivers and memory in each transceiver, and thus more costly than necessary to provide the desired functionality.

SUMMARY OF THE INVENTION

The invention provides an Asymmetric Digital Subscriber Line (ADSL) transceiver that manages multiple asynchronous ADSL sessions, synchronizing the digital signal processing tasks for the sessions with a buffering and scheduling scheme such that the various transceiver components operate seamlessly (i.e., in a semi-synchronous fashion).

Utilizing this buffering and scheduling methodology, reductions in the design sizes of various transceiver components and the data flow complexity of the transceiver may be achieved.

A central office transceiver (i.e., headend processor) according to the invention includes various functional elements and memories coupled together with digital signal processing tasks synchronized by a virtual clock signal. An Asynchronous Transfer Mode (ATM) Accelerator provides the network interface to multiple ATM channels for multiple asynchronous ADSL sessions. The ATM accelerator transfers frame data to a Frame Buffer (FB) as controlled by a Digital Signal Processing (DSP) core. The FB provides a dual access memory that is used in a ping-pang fashion, based on the logic level of the virtual clock, for the communication of data between the ATM accelerator and a Framer/Coder/Interleaver (FCI). The FCI performs various processing tasks on the frame data and also interfaces the DSP core through an Interleave/De-interleave Memory (IDIM), which holds DMT frames of data and may also be utilized in a ping-pang fashion. The DSP core generates the virtual clock signal, which is approximately 4 Khz and coincides with the ADSL Discrete MultiTone (DMT) symbol rate. The DSP core controls operation of the ATM accelerator and the FCI and performs various processing tasks such as moving data to/from the FB and the IDIM.

According to the buffering and scheduling scheme of the invention, after every transition of the virtual clock signal (i.e., in every virtual clock cycle), the transceiver first steps through ADSL lines, performing FCI transmit-processes for each active ADSL line and generating a control signal after completing all transmit-processes. The FCI then again steps through ADSL lines, processing receive-processes for all active ADSL lines and generating control signals indicating completion of receive processes and completion of all processing.

In every virtual clock cycle, the DSP core provides the FCI with data by reading Receive (RX) data frames to and loading Transmit (TX) data frames from the FB after processing. The FB is divided into segments for each individual ADSL session with the same memory space used for both RX data and TX data. The FCI and ATM accelerator first perform reading processes and then loading processes, reading RX data first before loading the TX data into the FB. In this way, the same buffer can be used for both RX data and TX data, thereby permitting the FB memory to be half the size of that in a conventional ADSL transceiver arrangement. The DSP core also loads RX data frames and reads TX data frames to/from the IDIM, which may be used in a ping-pang fashion by the FCI and DSP core.

Numerous other advantages and features of the present invention will become readily apparent from the following detailed description of the invention and the embodiments thereof, from the claims and from the accompanying drawings in which details of the invention are fully and completely disclosed as a part of this specification.

BRIEF DESCRIPTION OF THE DRAWINGS

For a better understanding of the present invention, reference may be had to the following Detailed Description of exemplary embodiments thereof, considered in conjunction with the accompanying drawings, in which.

In the detailed description below, like reference numerals are used to describe the same, similar or corresponding elements in FIGS. 1–3.

DETAILED DESCRIPTION

A headend transceiver (i.e., central office side processor) is provided for processing Asymmetric Digital Subscriber Line (ADSL) data. The provided ADSL transceiver implements a buffering and scheduling scheme for synchronizing the digital signal processing tasks for multiple asynchronous ADSL lines. As a result, the various components of the ADSL transceiver are able to operate seamlessly (i.e., in a semi-synchronous fashion) and the design sizes of various transceiver components and the data flow complexity of the transceiver are reduced. It should be noted, however, that the ADSL transceiver of the invention may alternatively incorporate other variations of DSL (i.e., xDSL), such as High bit-rate DSL (HDSL) and Very high bit-rate DSL (VDSL).

Asymmetric Digital Subscriber Line Communication System

Figure 1:
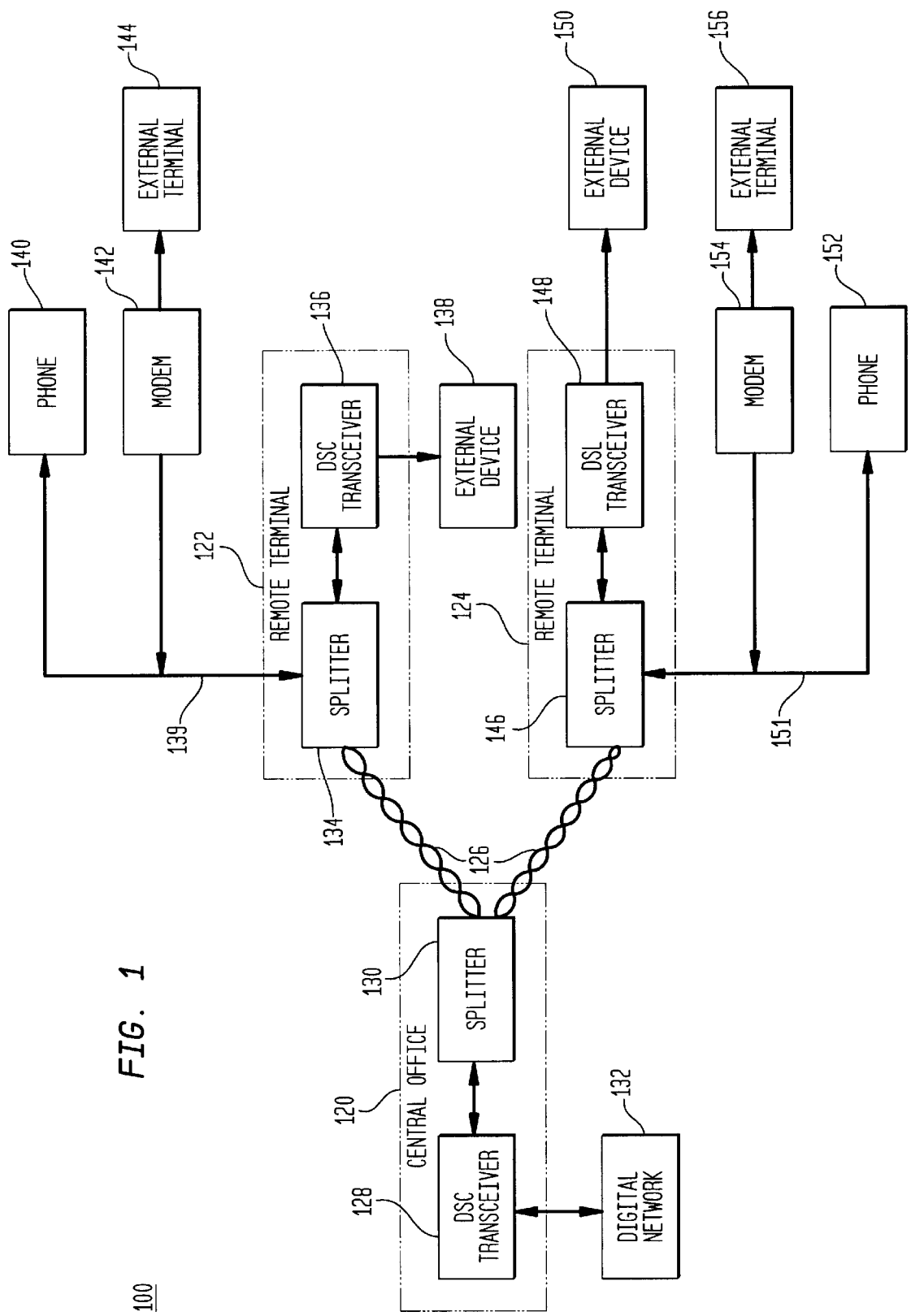
FIG. 1 illustrates, in block diagram form, an Asymmetric Digital Subscriber Line (ADSL) system/in accordance with the invention.

FIG. 1 illustrates, in block diagram form, an Asymmetric Digital Subscriber Line (ADSL) system in accordance with the invention. The ADSL system 100 includes a central office 120 and remote end user terminals 122–124, which are connected together copper twisted-pair media forming a telephone line 126. The central office 120 includes an ADSL transceiver according to the invention 128 and a splitter 130. Central office ADSL transceiver 128 is bi-directionally coupled to the splitter 130 and is additionally bi-directionally coupled externally to a digital network 132.

A first remote end user terminal 122 includes splitter 134 and conventional ADSL transceiver 136. ADSL transceiver 136 is bi-directionally coupled to splitter 134 and is additionally coupled to external device 138. The splitter 134 is bi-directionally coupled via a Plain Old Telephone Service (POTS) channel 139 to a telephone 140 and is additionally coupled to a modem 142. The modem 142 is further coupled to an external terminal 144. The second remote end user terminal 124 is similarly arranged. The second remote end user terminal 124 includes a splitter 146 and a conventional ADSL transceiver 148. The ADSL transceiver 148 is bi-directionally coupled to the splitter 146 and is additionally coupled to an external device 150. The splitter 146 is bi-directionally coupled via a POTS channel 151 to a telephone 152 and additionally coupled to a modem 154, which is further coupled to an external terminal 156.

The exemplary digital communication system 100 allows high-speed data communication between a variety of remote end users having computers, telephones, fax machines, modems, television sets, and any number of other communication devices. Digital network 132 is used to transmit information for a variety of high data rate interactive services, each of which may have a different transmission format and frequency. An exemplary digital communication system employing G.lite is similar to FIG. 1, with splitters 130, 134 and 146 merely replaced by a hardware device providing a direct correction to ADSL transceivers 128, 136, and 148 respectively.

Central Office ADSL Transceiver

Figure 2:
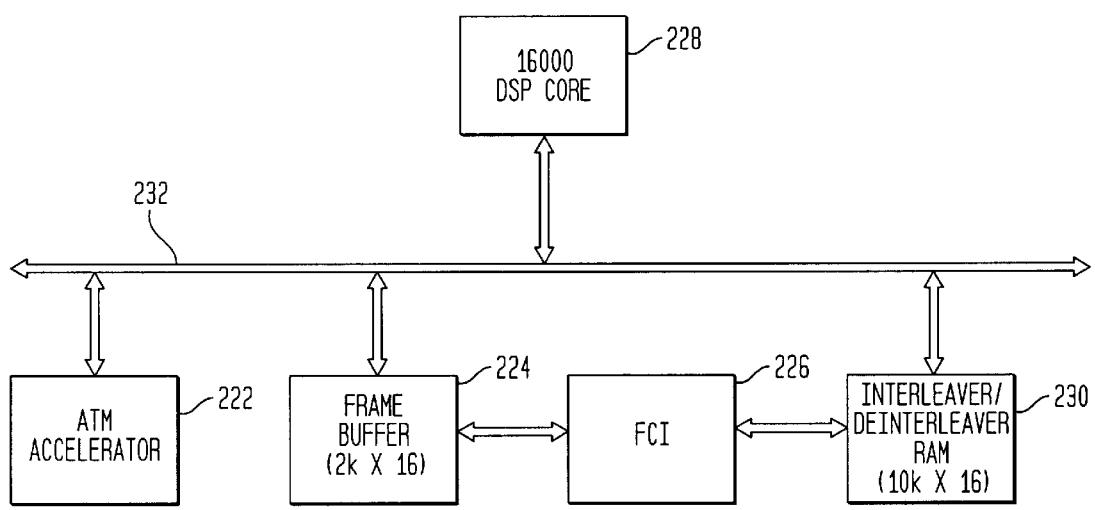
FIG. 2 illustrates, in block diagram form, an ADSL transceiver for a central office in accordance with the invention.

FIG. 2 illustrates a central office ADSL transceiver 120 according to the invention. The transceiver implements a buffering and scheduling scheme for synchronizing the processing of data on multiple ADSL lines (i.e., sessions), thereby enabling the various components of the transceiver to operate seamlessly (i.e., in a semi-synchronous fashion). In conventional ADSL, data arrives at and is transmitted by the ADSL transceiver asynchronously. The data is asynchronous in the sense that the recurrence of frames containing information to/from an individual end-user are not necessarily periodic. In addition, frame data does not necessarily arrive at the transceiver synchronous with a transition in a transceiver clock; the transceiver clock may not coincide with the start of any frame of data. Therefore, frame data must be buffered in order to make frame data for each ADSL line available for processing on a transition of a transceiver clock. The transceiver of the invention buffers and schedules these asynchronous communications for multi-session ADSL, synchronizing digital signal processing tasks utilizing an approximately 4 Khz virtual clock of the same frequency as the ADSL Discrete MultiTone (DMT) symbol rate. This buffering and scheduling scheme permits reductions in the design size of transceiver components and the data flow complexity of the transceiver.

The ADSL transceiver of the invention 120 is a single integrated circuit which has various component including: an Asynchronous Transfer Mode (ATM) accelerator 222, a Frame Buffer (FB) 224, a Framer/Coder/Interleaver (FCI) 226, a Digital Signal Processing (DSP) core 228, and a Interleave/De-Interleave Memory (IDIM) 230. The FCI 226 interfaces the ATM accelerator 222 through the FB 224 and interfaces the DSP core 228 through the IDIM 230. Transceiver components that interface each other may be bi-directionally coupled via a bus 232, which refers to a plurality of signals or conductors which may be used to transfer one or more various types of information, such as data, address, control, or status information. In a preferred embodiment, the bus 232 is a sixteen bit bus. A virtual clock signal of approximately 4 Khz, which coincides with the ADSL DMT symbol rate, is generated by the DSP core 228 and controls the operation of the ATM accelerator 222 and FCI 226.

The Asynchronous Transfer Mode (ATM) accelerator 222 is the network interface to multiple ATM channels (not shown). The ATM accelerator provides those functions that are responsible for data transport for a plurality of data streams communicated via twisted pair media. The data may be transported on any one of a plurality of programmable bearer channels. The data is synchronized into an appropriate one of the plurality of programmable bearer channels and the channels multiplexed in the ATM accelerator as determined by the ADSL standard. The ATM accelerator subjects this framed data to various operations that calculate a plurality of complex numbers representing DMT tones. The ATM accelerator subsequently transfers this DMT tone data on the twisted-pair media. In exemplary embodiments, the ATM accelerator may include UTOPIA-2 and serial port external network interface elements.

The Frame Buffer (FB) 224 provides a dual access memory that is used in a ping-pang fashion to transfer unframed bearer channel data between the ATM accelerator 222 and the FCI 226. "Ping-pang" means that areas of the memory buffer are alternately utilized exclusively by one agent (a transceiver component for performing some function) and then by a second agent. As one area of memory is being used by a first agent, another area of memory can be used by a different agent. As long as different agents (in this case, the ATM accelerator and the FCI) access different areas of a dual access memory, there are no memory address conflicts that could cause communication errors. At any time, an agent is allowed to access either a ping area of memory or a pang area of memory based on the logic level of the virtual clock signal. Thus, the FB should be allocated a memory of a size sufficient to provide ping-pang functionality. In the preferred embodiment as illustrated in FIG. 2, the frame buffer is allocated as two 1 K×16 memory blocks, since the smallest Random Access Memory (RAM) block currently available is 1 K×16.

The Framer/Coder/Interleaver (FCI) 226 interfaces the ATM accelerator 222 through the FB 224. The FCI Supports multiple ADSL sessions and performs various tasks on payload data including: framing/de-framing, cyclic redundancy check generation/checking (CRCing), scrambling/de-scrambling, Reed-Solomon encoding/decoding, and interleaving/de-interleaving. The FCI may also provide Network Timing Reference generation and insertion, Interleave and Fast Path support, and access to its internal state and data in support of a test methodology using the DSP core as smart test controller. All functionalities of the FCI are provided as per ADSL standards. In a preferred embodiment of the invention, approximately four G.lite (ITU G.992.2) or approximately four ADSL (ANSI T1.413-1998) sessions are supported by the FCI. It should be noted that the FCI is able to support additional sessions limited only by the size of the buffers with which it is interconnected and not limited to any specific implementation.

The Digital Signal Processing (DSP) core 228 generates a virtual clock signal that controls the operation of the ATM accelerator 222 and the FCI 226. The virtual clock signal is an approximately 4 Khz signal that coincides with the ADSL DMT symbol rate. The DSP core 228 also responds to control signals generated by the ATM accelerator 222 and FCI 226 and performs various tasks such as moving data to/from the FB 224 and the IDIM 230. The DSP core may access the other components of the transceiver through a standard memory read/write operation. Alternatively, the components of the transceiver of the invention need not necessarily be co-located on a single computer chip. In that case the DSP core may access other transceiver components via a programmable (Direct Memory Access) DMA channels. DMA allows data to be sent directly from an attached device to the a processor's memory In the exemplary embodiment, the transceiver uses a Digital Signal Processor (DSP) core and is preferably implemented as a core of an DSP16K single chip DSP, which is available from Lucent Technologies, Inc., of Murrary Hill, N.J. it should be noted, however, that other types of processor cores may also be utilized for the DSP core. According to the invention, processing components of the transceiver communicate with the DSP core. Other processing elements having additional functionality may be added to the transceiver as needed and implemented as peripheral modules to the DSP core. Thus, the invention is not limited to the particular components disclosed herein.

The Interleave/De-Interleave Memory (IDIM) 230 provides a memory through which the FCI 226 interfaces the DSP core 228. The IDIM holds DMT frames of data and may be utilized in a ping-pang fashion. The IDIM is used to transfer framed, coded and possibly interleaved data frames between the FCI core and the DSP Core. In addition to interleave data storage, the IDIM may contain a dedicated area for the transfer of fast path data to the DSP Core. The IDIM may be organized as 16 bit words with byte write capability to allow beneficial performance of various interleave/de-interleave processes.

In a preferred embodiment of the invention, the IDIM is allocated as 10 K×16 (i.e., 20 K) Random Access Memory (RAM), which supports approximately four G.lite or approximately four standard ADSL session/s at less than full interleave depth. The size of the IDIM and the interleave depth may be varied so that a different number of sessions may be supported by the transceiver of the invention. The size of the IDIM is derived as follows. A simple implementation of a transmit interleaver for G.lite communication requires 4 Kbytes per session for downstream processing, derived by multiplying the maximum codeword length by the maximum interleaver depth. The simple G.lite transmit interleaver also requires 2 Kbytes per session for upstream processing. Therefore, 24 Kbytes of RAM is required to support four G.lite sessions. Similarly, a simple implementation of a transmit interleaver for standard ADSL requires 16 Kbytes per session for downstream processing and 2 Kbytes per session for upstream processing, for a total of 72 Kbytes for four sessions. A fast path buffer is also required for fast path data in both the interleave and de-interleave processes and requires 256 bytes of RAM per session, or a total of 1 K bytes for four sessions. Since the smallest RAM block currently available is 1 K×16, 1 K×16or 2 Kbytesmust be allocated for the fast path buffer per direction. Therefore, a simple implementation of an interleaver would require 76 Kbytes for four standard ADSL sessions (64 K interleave +8 K de-interleave +4 K fast path). An optimal implementation of the interleaver according to the method of the invention utilizes the same memory for receive data and transmit data and thus requires 20 Kbytes to support a standard ADSL session at full interleave depth (16 K interleave & de-interleave +4 K fast path). With a lesser interleave depth, additional sessions may be supported with the same size buffer. With a larger buffer, additional session may be supported.

It should be noted that in a preferred embodiment, the firmware required for performing processing tasks associated with the central office is resident on the single integrated circuit transceiver of the invention. As functions implemented in hardware are typically executed more quickly than those implemented in software, for optimal speed, central office transceiver of the invention implements its functions in hardware so that data is transmitted at a high rate. It should be noted, however, that similar functionality can be provided in a software implementation.

Buffering and Scheduling Scheme

To provide ADSL service, normal operation of the ADSL transceiver of the invention requires that, in every virtual clock cycle, the DSP core provide the FCI with data by reading one or more frames of Receive (RX) data from the FB (Frame Buffer) and loading one or more frames of Transmit (TX) data to the FB. In addition, the DSP core needs to load one or more frames of RX data to the IDIM and read one or more frames of TX data from the IDIM.

Figure 3:
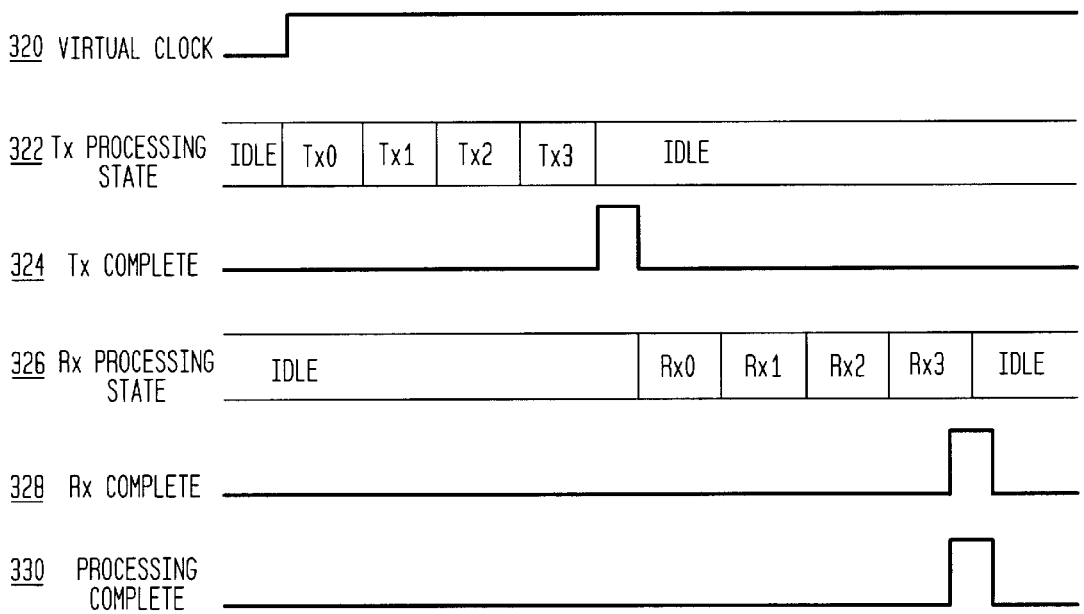
FIG. 3 illustrates, an exemplary processing sequencing for a case when four Transmit and Receive lines are enabled.

FIG. 3 depicts an exemplary processing sequence according to the invention for a case when four ADSL lines are enabled (i.e., four sessions are active). FCI processing is initiated by a transition of the virtual clock signal 320. Logic within the FCI captures the state of the virtual clock signal on successive CLK rising edges to detect the transition. Virtual clock signal transitions are generated by the DSP Core at an approximately 4 KHz rate (i.e., approximately 69/68*4 KHz), locked to the modem frame rate and local timing reference. According to the buffering and scheduling scheme of the invention, after every transition of the virtual clock signal (i.e., in every virtual clock cycle), the FCI core first processes TX data for each active ADSL line 322 (reading from the FB, framing, CRCing, scrambling, encoding and interleaving). After processing TX data, the FCI core then processes RX data for each active ADSL line 326 (deinterleavilg, decoding, CRCing, descrambling, and deframing, writing to the FB). This sequence of operations minimizes memory requirements by allowing the RX data to overwrite the same memory area in the FB that is used by the TX data, thereby permitting the size of the FB to be half that of a conventional ADSL transceiver. Since buffers/memory space consume integrated circuit area and add to the cost of a device, the memory savings and corresponding reduction in buffer size permitted by the invention reduces integrated circuit area and ADSL transceiver cost. In addition, since the single transceiver sequentially performs processing for multiple ADSL sessions, a central office that utilizes the ADSL transceiver of the invention consistently requires a lesser number of ADSL transceivers than prior art ADSL communications systems. While described in terms of an ADSL transceiver, the buffering and scheduling scheme of the invention may also be utilized in transceivers for various xDSL communication systems including High bit-rate DSL (HDSL) and Very high bit rate DSL (VDSL).

In a given virtual clock processing cycle, the stream processing state machine (i.e., FCI) will first begin processing TX data. The FCI will step through each TX line in increasing order, testing for enabled lines and initiating a TX processing state for a line as required 322. If a TX line is not enabled, the FCI immediately evaluates the next TX line. After evaluating all TX lines and processing all enabled TX lines, the FCI signals the DSP core that all TX processes are complete (TX_Complete 324). Note that, because of the processing cycle operation, all TX lines are modem frame aligned when a processing cycle is complete and TX line data resides in the IDIM.

Once TX processes are complete, the FCI begins processing RX data. The FCI steps through each RX lines in increasing order, testing for enabled lines and initiating a RX processing state for a line as required 326. If an RX line is not enabled, the FCI immediately evaluates the next RX line. After evaluating all RX lines and processing all enabled RX lines, the FCI signals the DSP core that all RX processes are complete (RX_Complete 328) and that all processing is complete (Processing_Complete 330). Note that, because of the processing cycle, all RX Lines must be modem frame aligned when placed in the IDIM for processing by the FCI. The DSP core may require additional memory to perform this alignment, which may have some impact on overall RX path latency. In every DMT symbol cycle (i.e., virtual clock cycle), the FCI will load the FB, which is divided into segments for each individual ADSL session, with received data after receiver processing. The same memory space in the FB is used for both RX data and TX data. The FCI and the ATM accelerator always start the reading process and then the loading process. That is, the ATM accelerator reads RX data first before loading the TX data into the frame buffer. In this way, the same buffer can be used for both RX data and TX data, thereby permitting the size of the FB to be half that of a conventional ADSL transceiver arrangement.

The IDIM may also be used in a ping-pang fashion by the FCI and the DSP core based on the virtual clock cycle. For example, between the events of the virtual clock signal transition and the rising edge of the TX processes are complete signal (TX_Complete 324), the DSP core may load new DMT frames of RX data to a portion of the IDIM used as de-interleave memory while the FCI is using a portion of the IDIM as interleave memory. Between the events of TX_Complete 324 and signal that all RX processes are complete (RX_Complete 328), the DSP core can read TX data from the portion of the IDIM used as interleave memory while FCI is accessing the portion of the IDIM used as de-interleave memory.

Conclusion

There has been described and illustrated herein, an method and apparatus for synchronizing the asynchronous data processing tasks for multiple Asymmetric Digital Subscriber Line (ADSL) sessions using a single ADSL transceiver. The headend ADSL transceiver of the invention implements a buffering and scheduling scheme such that various transceiver components operate seamlessly (i.e., in a semi-synchronous fashion) and share memory. Based on a virtual clock signal that coincides with the DMT symbol rate, the transceiver steps through all ADSL lines and processes receive tasks. After completing receive tasks, the transceiver, steps through all ADSL lines and processes transmit tasks. Thus, the same memory may be used by each of multiple ADSL sessions and by both transmit processes and receive processes. Thus, a lesser number of transceivers, each transceiver utilizing a lesser amount of memory, may be used to implement an ADSL communication system according to the invention.

It is to be understood that the invention is not limited to the illustrated and described forms and embodiments contained herein. It will be apparent to those skilled in the art that various changes using different configurations and functionally equivalent components and programming may be made without departing from the scope of the invention. Thus, the invention is not considered limited to what is shown in the drawings and described in the specification and all such alternate embodiments are intended to be included in the scope of this invention as set forth in the following claims.

What is claimed is:

1. A digital subscriber line (DSL) transceiver for a plurality of DSL sessions, said DSL transceiver comprising:
    an asynchronous transfer mode (ATM) accelerator interfacing a plurality of ATM channels for each of said plurality of DSL sessions, said ATM accelerator operative to convert a first analog signal to a first bit stream, said ATM accelerator operative to convert a second bit stream, said ATM accelerator operative to convert a second bit stream to a second analog signal;
    a frame memory bi-directionally coupled to said ATM accelerator, said frame memory operative to receive a bit stream and store said bit stream as a frame of data;
    a framer/coder/interleaver (FCI) bi-directionally coupled to said frame memory, said FCI operative to perform a data operation on said frame of data;
    an interleave/de-interleave memory (IDIM) bi-directionally coupled to said FCI, said IDIM operative to receive said frame of data and store said frame of data; and
    a digital signal processing (DSP) core for performing a processing task, said DSP core bi-directionally coupled to said ATM accelerator, said frame memory and said IDIM,
    wherein said DSP core includes a means to generate a periodic signal, wherein, responsive to said periodic signal, said transceiver performs a transmit process sequentially for a first subset of said plurality of DSL sessions and performs a receive process sequentially for a second subset of said plurality of DSL sessions.

2. The DSL transceiver of claim 1, wherein said periodic signal is generated at a frequency of 69/68×4 KHz.

3. The transceiver of claim 1, wherein said data operation performed by said FCI is selected from the group consisting of framing, de-framing, error checking, scrambling, de-scrambling, encoding, de-coding, interleaving and de-interleaving.

4. The transceiver of claim 1, wherein said FCI further includes
    a means for framing/de-framing said frame of data;
    a means for error check generation and evaluation of said frame of data;
    a means for scrambling/de-scrambling said frame of data;
    a means for encoding/de-coding said frame of data; and
    a means for interleaving/de-interleaving said frame of data.

5. The DSL transceiver of claim 1, wherein said FCI further includes:
    a means for performing a transmit process sequentially for a first subset of said plurality of DSL sessions;
    a means for generating a first signal indicating said transmit process for said first subset of said plurality of DSL sessions has been performed;
    a means for performing a receive process sequentially for a second subset of said plurality of DSL sessions; and
    a means for generating a second signal indicating said receive process for said second subset of DSL sessions has been performed.

6. The DSL transceiver of claim 1, wherein said FCI further includes
    a means for generating and inserting a network timing reference;
    a means providing interleave and fast path support; and
    a means providing access to internal state and data of said FCI.

7. The DSL transceiver of claim 1, wherein said DSP core includes
    a means to move said bit stream between said ATM accelerator and said frame memory;
    a means to move said frame of data to said IDIM.

8. The DSL transceiver of claim 1, wherein said frame memory operates in a ping-pang fashion based on said periodic signal.

9. The DSL transceiver of claim 1, wherein said frame memory is a RAM of a size that supports at least two of said frames of data and operates in a ping-pang fashion.

10. The DSL transceiver of claim 1, wherein said IDIM further includes a fast path memory.

11. The DSL transceiver of claim 1, wherein said IDIM operates in a ping-pang fashion based on said periodic signal.

12. The DSL transceiver of claim 1, wherein said IDIM is a RAM of a size that supports at least four full depth G.lite sessions or approximately one full depth standard ADSL session.

13. The DSL transceiver of claim 1, wherein each of said plurality of DSL sessions supported by said DSL transceiver is XDSL selected from the group consisting of asymmetric DSL (ADSL), High bit-rate DSL (HDSL), and Very high bit rate DSL (VDSL).

14. The DSL transceiver of claim 1, wherein each of said plurality of DSL sessions supported by said DSL transceiver is modulated according to a modulation technology selected from the group consisting of Discrete Multitone, Carrierless Amplitude Modulation, and Multiple Virtual Line.

15. A method of buffering and scheduling for a multi-session digital subscriber line (DSL) transceiver, said method comprising the steps of generating a periodic signal, said periodic signal having a rising edge and a declining edge;

responsive to said rising edge of said periodic signal, sequentially performing a transmit process for each of a first plurality of DSL sessions, said transmit process utilizing a first memory;

generating a first signal indicative of a completion of said transmit process for said first plurality of DSL sessions;

responsive to said first signal, sequentially performing a receive process for a second plurality of DSL sessions, said receive process utilizing a second memory; and generating a second signal indicative of a completion of said receive process for said second plurality of DSL sessions.

16. The method of buffering and scheduling of claim 15 wherein said first memory and said second memory are the same.

17. The method of buffering and scheduling of claim 16 wherein said first memory and said second memory are operated in a ping-pang fashion based on a state of said periodic signal.

18. A digital subscriber line (DSL) transceiver for transmitting and receiving data for a plurality of DSL sessions, said DSL transceiver composing:

an asynchronous transfer mode (ATM) accelerator interfacing a plurality of asynchronous transfer mode channels for each of a plurality of DSL sessions, said ATM accelerator including a means to perform a first transmit process and a means to perform a first receive process on frame data;

a frame buffer for holding said frame data;

a framer/coder/interleaver (FCI) interfacing said ATM accelerator through said frame buffer, said FCI including a means to perform a second transmit process and a means to perform a second receive process on said frame data;

an interleave/de-interleave memory (IDIM); and a digital signal processing (DSP) core interfacing said FCI through said IDIM, said DSP core including a means to perform a third transmit process and a means to perform a third receive process on said frame data;

wherein said first transmit process, said second transmit process and said third transmit process are characterized as transmit processing, and said first receive process, said second receive process and said third receive process are characterized as receive processing; and wherein said DSP core includes a means to generate a periodic signal, said periodic signal operative to initiate a performance of transmit processing sequentially for a first subset of said plurality of DSL sessions and a performance of a receive processing sequentially for a second subset of said plurality of DSL sessions.

19. The DSL transceiver of claim 18, wherein said periodic signal is generated at a frequency of 69/68×4 Khz.

20. The DSL transceiver of claim 18, wherein said first transmit process converts a first bit stream to a first analog signal and said first receive process converts a second analog signal to a second bit stream.

21. The DSL transceiver of claim 18, wherein said second transmit process is selected from the group consisting of framing, error check generation, scrambling, encoding, and interleaving.

22. The DSL transceiver of claim 18, wherein said second receive process is selected from the group consisting of de-framing, error check evaluation, de-scrambling, de-coding and de-interleaving.

23. The DSL transceiver of claim 18, wherein said third transmit process and said third receive process comprises moving said frame data.

24. A DSL transceiver of claim 18, wherein said frame buffer is a RAM buffer operated in a ping-pang fashion based on said periodic signal.

25. A DSL transceiver of claim 18, wherein said IDIM is a RAM buffer operated in a ping-pang fashion based on said periodic signal.

26. A DSL transceiver of claim 18, wherein said IDIM is a RAM buffer sized to support at least four full depth G.lite sessions or approximately one full depth standard ADSL session.

\* \* \* \* \*